United States Patent [19]

Hauser et al.

[11] 4,232,569

[45] Nov. 11, 1980

[54] TRANSAXLE

[75] Inventors: Hans Hauser, Fredericktown; William J. Clayborne, Mount Vernon, both of Ohio

[73] Assignee: The J. B. Foote Foundry Co., Fredericktown, Ohio

[21] Appl. No.: 849,011

[22] Filed: Nov. 7, 1977

[51] Int. Cl.² .............................................. F16H 37/08
[52] U.S. Cl. ...................................... 74/701; 74/607; 74/713
[58] Field of Search ................. 74/701, 700, 360, 331, 74/325, 713, 710, 710.5, 711, 714, 606 R, 607, 801, 694, 695

[56] References Cited

U.S. PATENT DOCUMENTS

| | | | |
|---|---|---|---|
| 1,211,673 | 1/1917 | Calkins | 74/713 |
| 1,961,809 | 6/1934 | Wood | 74/700 |
| 1,983,955 | 12/1934 | Von Soden-Fraunhofen | 74/700 |
| 2,197,758 | 4/1940 | Daub | 74/701 |
| 2,710,546 | 6/1955 | Du Shane et al. | 74/360 |
| 3,099,165 | 7/1963 | Heth et al. | 74/342 |
| 3,309,943 | 3/1967 | Kosman et al. | 74/701 |
| 3,563,110 | 2/1971 | Hauser | 74/473 R |
| 4,038,882 | 8/1977 | Keller | 74/360 |

*Primary Examiner*—Allan D. Herrmann
*Attorney, Agent, or Firm*—Allen D. Gutchess, Jr.

[57] ABSTRACT

A transaxle is provided, especially for small riding vehicles, such as lawn mowers. The transaxle is exceptionally shallow, with the gear shift lever entering the housing on about the same level as the rear axles. The transaxle has six forward speeds in a compact housing by virtue of a unique gear train arrangement in which shafts serve multiple functions. A driven bevel gear in the transaxle housing is also backed-up by a structurally-integral rib or flange in the housing. A unique bearing design provides effective lubrication for the output shafts or axles of the transaxle. A compact differential of the transaxle also rotates within a cavity without any axle.

6 Claims, 7 Drawing Figures

TRANSAXLE

This invention relates to a transaxle particularly designed for small riding vehicles.

The new transaxle is shallow with the housing generally horizontally disposed. The gear shift lever enters a front portion of the housing only slightly above a horizontal plane taken through the rear axles. While the new transaxle has a number of forward speeds, it is relatively compact with the input and output shafts also carrying additional gears which are components of the gear trains that provide the multiple speeds. In addition to the main shift lever, an additional, external shift arrangement is provided to enable the selection of a high range or low range of forward speeds. Also, a driven bevel gear in the housing is backed-up by a rib or flange in the housing to minimize lateral deflection of the shaft on which the gear is mounted.

The new transaxle also has a unique bearing design for the axles. The outboard portion of each axle is supported by an upper, generally semi-cylindrical bearing surface in an upper part of the housing, with a lubricant cavity formed therebelow by a lower part of the housing. An adjacent inboard portion of the lower housing part has a lower, generally semi-cylindrical bearing surface with a lubricant cavity formed thereabove in the upper part of the housing. The lubricant cavities connect with one another to receive lubricant from a single fitting.

The new transaxle also includes a compact differential. A main ring gear of the differential is rotatably supported in a cavity of the transaxle housing without employing any axle at all. Within the main ring gear, miter gears of the differential are carried on an idler shaft, the ends of which are held in grooves in the main ring gear.

It is, therefore, a principal object of the invention to provide an improved transaxle having the features suggested above.

Another object of the invention is to provide a transaxle, particularly for small riding vehicles, which is compact and generally horizontally disposed, with the gear shift lever being about on the same level as the rear axles.

A further object of the invention is to provide an improved transaxle having multiple forward speeds with an additional external shift arrangement for selecting a high range or a low range of speeds.

Still another object of the invention is to provide a transaxle with bearing supports which enable more effective lubrication of the axles.

Still a further object of the invention is to provide a transaxle with a compact differential.

Yet another object of the invention is to provide a transaxle having a driven bevel gear backed up by a flange or rib which is structurally integral in the transaxle housing.

Many other objects and advantages of the invention will be apparent from the following detailed description of a preferred embodiment thereof, reference being made to the accompanying drawings, in which.

Figure 1:
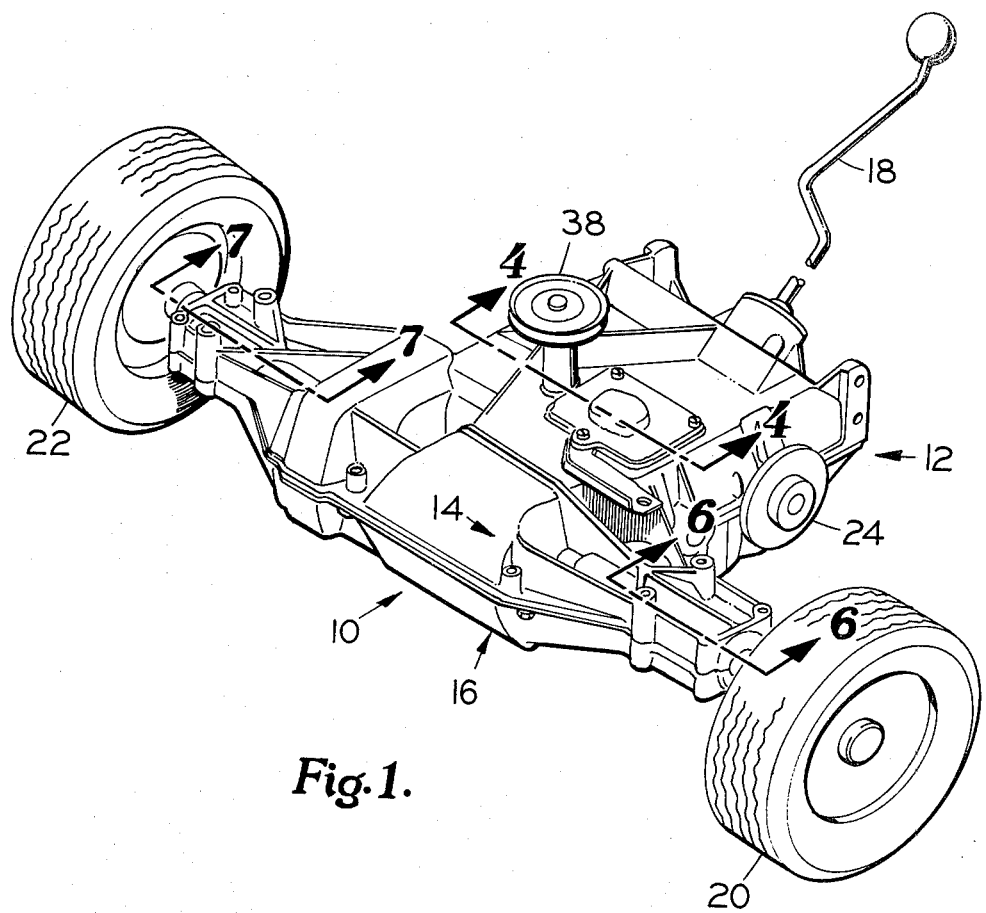
FIG. 1 is a rear view in perspective of a transaxle according to the invention, with wheels attached to axles thereof.

Referring to the drawings, and more particularly to FIG. 1, a transaxle embodying the invention is indicated at 10 and is positioned as it would be if mounted on a small riding vehicle such as a riding lawn mower, for example. The transaxle includes a generally horizontally disposed housing 12, including an upper housing half or part 14 and a lower housing half or part 16. The housing is shallow and generally horizontally disposed with a forward gear shift lever 18 entering the housing near the level of the axes of rear wheels 20 and 22. The transaxle 10 also is equipped with a disc brake generally indicated at 24. This brake can be similar to that shown in Hauser U.S. Pat. No. 3,563,110 or Craft and Hauser application, U.S. Ser. No. 800,932. Hence, it will not be discussed in detail.

Figure 2:
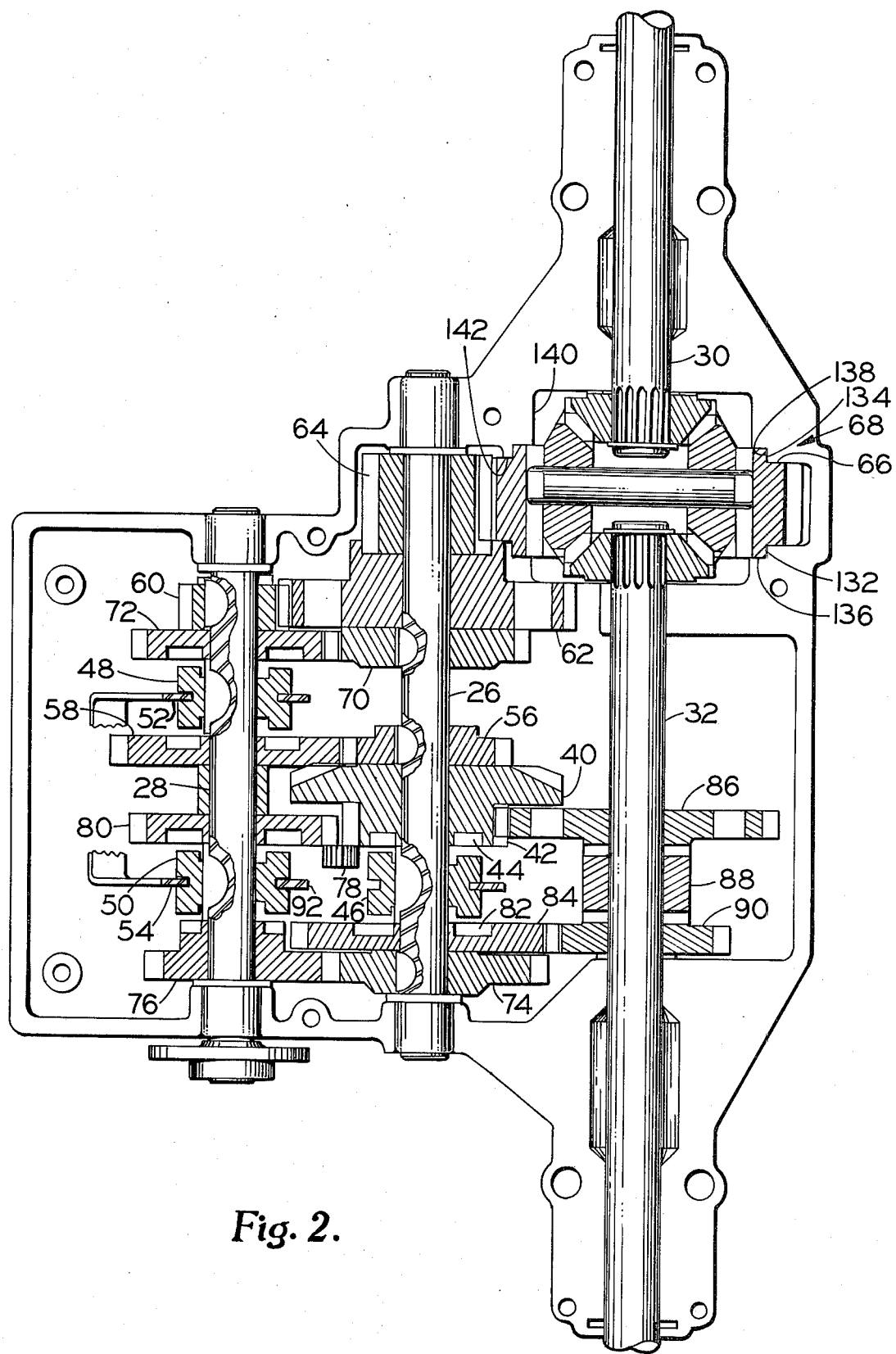
FIG. 2 is a somewhat schematic bottom view of the transaxle of FIG. 1 with the lower housing part removed.
Figure 4:
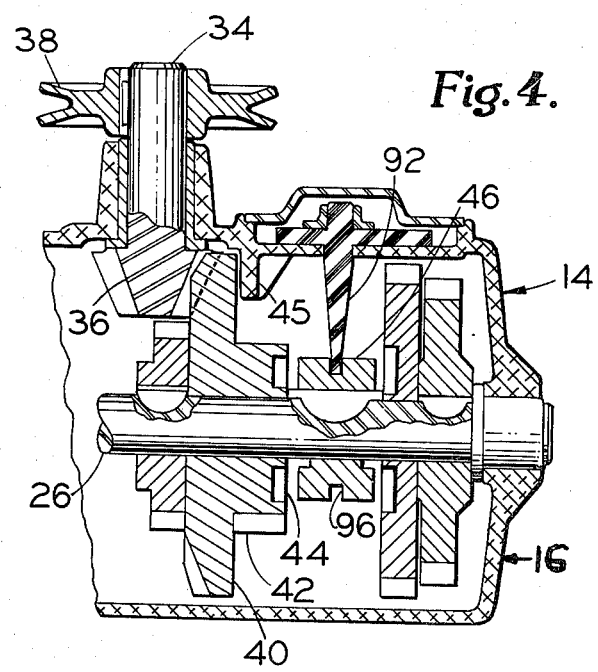
FIG. 4 is a fragmentary view in cross section taken along the line 4—4 of FIG. 1.

Referring more particularly to FIGS. 2 and 4, the transaxle 10 includes a middle input shaft 26, a forward intermediate or shifting shaft 28, and rear output shafts or axles 30 and 32. The input shaft 26 is driven through a vertical drive shaft 34 having a drive bevel gear 36 and having an outer drive pulley 38 which can be suitably driven through a belt and an engine mounted forwardly on the vehicle. A driven bevel gear 40 is rotatably mounted on the input shaft 26 and has an integral spur gear 42 therewith equipped with recessed shift teeth 44. The outer periphery of the driven bevel gear 40 is backed up on the side opposite the teeth by a rib or flange 45 which is structurally integral with the upper housing part 14. The rib 45 supports the driven bevel gear 40 to maintain it in position on the input shaft 26 and also to prevent or minimize lateral deflection of the input shaft 26 when under load.

A high and low range speed selector shift dog 46 is keyed to the input shaft 26 and provides a high range of three forward speeds when shifted to the right position by external means to be discussed subsequently and engaged with the teeth 44 of the gear 42. The input shaft 26 then rotates with the driven bevel gear 40.

Two shifter dogs 48 and 50 are keyed on the intermediate shaft 28 and are shifted back and forth by shifter forks 52 and 54 engaged therewith. The shifter forks are shifted by the lever 18 when manipulated in an H-pattern through suitable mechanism such as that shown in Hauser U.S. Pat. No. 3,563,110 and will not be discussed in detail. When the shifter dog 48 is moved to the left, a first forward speed is provided through gears 56, 58, and 60. The latter meshes with a spur gear 62 rotatably mounted on the input shaft 26 and mechanically engages with a spur gear 64 also rotatably mounted on the input shaft. The gear 64 then drives a main ring gear 66 of a differential 68, to be discussed subsequently.

A second forward speed is provided when the shifter dog 48 is moved to the right. This is achieved through gears 70 and 72 along with the gears 60–66.

A third forward speed is provided when the shifter dog 48 is moved back to the middle, neutral position and the dog 50 is moved to the left. This is achieved through a gear train including gears 74 and 76 and the gears 60–66.

When the shifter dog 50 is moved to the right position, a single reverse speed is achieved. This is accomplished through a gear train including the spur gear 42, an idler gear 78 which is rotatably carried by an ear of the upper housing part 14, and a spur gear 80. The gears 60–66 are then driven in the reverse directions.

When the speed selector shift dog 46 is moved to the left position, there being no middle or neutral position, a low range of forward speeds is achieved. In this position, the dog 46 engages teeth 82 of a spur gear 84 on the input shaft 26 to cause the gear 84 to rotate with the input shaft 26. With the dog 48 in the left position, a low range, fourth forward speed is achieved when the spur gear 42 is rotated. It rotates a spur gear 86 which is rotatable on the output axle or shaft 32. The gear 86 is connected through a toothed sleeve 88 with a second spur gear 90 also rotatably mounted on the output shaft 32. The gear 90 then drives the spur gear 84 which rotates the input shaft 26 at a slower rate than when the input shaft was driven directly through the bevel gear 40 and the spur gear 42. The fourth forward speed is then achieved through the gears 56–66.

When the dog 48 is moved to the right position, a fifth forward speed is achieved through the gears 42, 86, 88, 90, 84, 70, 72, and 60–66.

When the dog 48 is in neutral and the dog 50 is moved to the left, a sixth forward speed is achieved through the gears 42, 86, 88, 90, 84, 74, 76, and 60–66.

When the shift dog 50 is moved to the right position to engage the gear 80, the same reverse speed is achieved as before through the spur gear 42, the idler 78, the gear 80, and the gears 60–66.

From the above, it will be seen that the six forward speeds can be achieved through a compact transaxle because the input shaft and the output shaft serve in addition as idler shafts. Specifically, gears forming parts of the gear trains for the various speeds are mounted on the input shaft and also gears forming parts of the gear trains which achieve the slower three forward speeds, designated fourth, fifth and sixth above, are rotatably mounted on one of the output shafts or axles and specifically the shaft 32. Further, with all of the shafts mounted on a common plane, the shallow contour of the transaxle 10 is achieved, enabling a riding lawn mower manufacturer, for example, to achieve greater versatility in the design of his mower by utilizing the shallow and compact transaxle.

Figure 3:
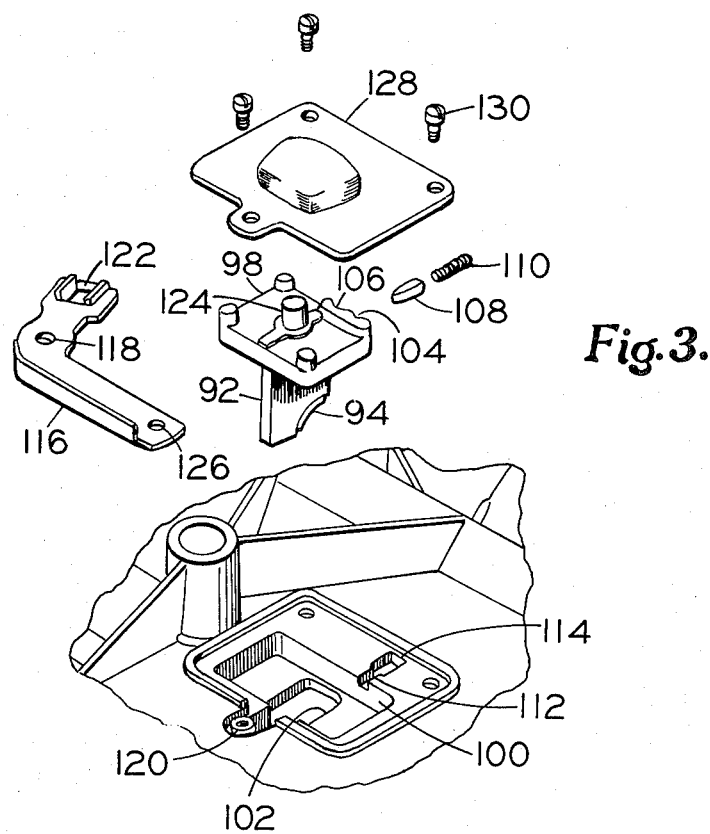
FIG. 3 is an exploded view in perspective of an external shift arrangement for shifting between high and low ranges of forward speeds.

The shift means for the high and low speed shifter dog 46 is shown more particularly in FIGS. 3 and 4. A shifter fork 92 has a lower arcuate ridge 94 extending into a narrow annular groove 96 in the dog 46. The shifter fork also has an upper slide 98 located in a shallow recess 100 cast in the upper housing part 14 when the shifter fork 92 extends through an opening 102 in the housing part. The slide 98 has two notches 104 and 106 therein which receive a detent 108 urged toward the notches by a spring 110. The detent 108 is located in a groove 112 in the housing part 14 and the spring 110 is located in a recess 114 behind the groove. When the shifter fork 92 is in the high speed range position and engaged with the spur gear 42, the detent 108 projects into the notch 104 of the slide 98. When the shifter fork 92 is in the low range position with the shifter dog 46 engaged with the spur gear 84, the detent 108 is in the notch 106.

For moving the shifter fork 92 and the slide 98 between the two positions, a generally L-shaped metal lever 116 is provided. The lever 116 has an intermediate opening 118 pivotally received on a post 120 of the upper housing part 14 and has an enlarged end opening 122 which receives a post 124 of the slide 98. The opposite end of the lever 116 also has an opening 126 to receive a Bowden wire or the like for remote operation of the lever. A suitable cover 128 is provided and is affixed to the upper housing part by fasteners 130.

Figure 5:
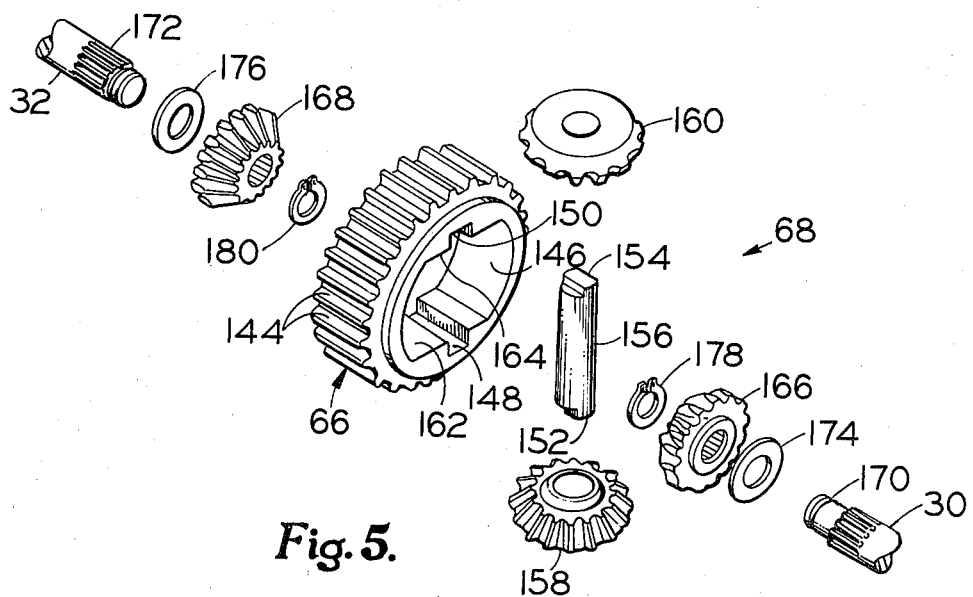
FIG. 5 is an exploded view in perspective of a differential of the transaxle.

The differential 68 is shown more particularly in FIGS. 2 and 5. The ring gear 66 has annular side shoulders 132 and 134 which are carried by annular shoulders 136 and 138 formed in matching cavities 140 in the upper and lower housing parts 14 and 16. The cavities 140 also form an opening 142 through which teeth 144 of the ring gear 66 project to mesh with the teeth of the gear 64. With the annular shoulders 136 and 138 of the cavities 140 forming the full bearing surfaces for the ring gear shoulders 132 and 134, no axle is required for the ring gear 66 and the differential can be correspondingly more compact. Without an axle, the ring gear 66 has a large central opening 146 therein with diametrically opposite grooves or channels 148 and 150. These receive flattened, reduced ends 152 and 154 of an axle 156 extending across the opening 146. Miter gears 158 and 160, specifically beveled pinion gears, are rotatably mounted on the axle 156 and are backed up by flat surfaces 162 and 164 on either side of the grooves 148 and 150.

Driven miter gears 166 and 168, being specifically beveled side gears, are affixed on splined ends 170 and 172 of the output shafts or axles 30 and 32. Bearing washers 174 and 176 are located behind the beveled gears 166 and 168 and split rings 178 and 180 are located at the ends of the shafts 30 and 32. The beveled gears 166 and 168 are backed up by annular flat portions of the cavities 140.

Figure 6:
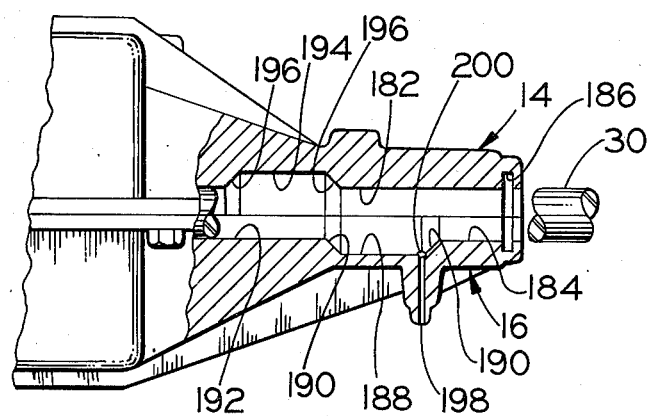
FIG. 6 is a fragmentary view in cross section, taken along the line 6—6 of FIG. 1, and showing a bearing support for a rear axle.
Figure 7:
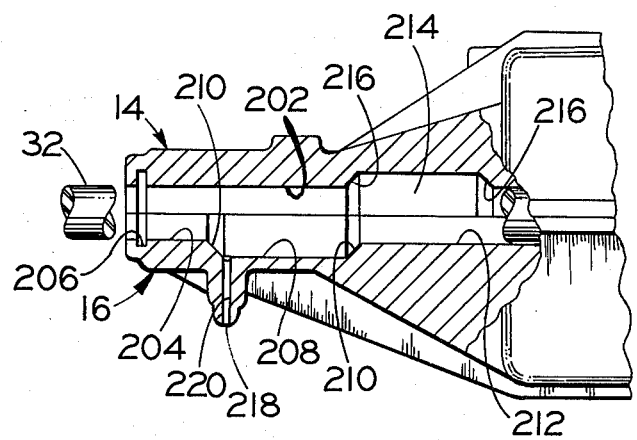
FIG. 7 is a fragmentary view in cross section taken along the line 6—6 of FIG. 1, and showing a bearing support for the other rear axle.

The bearing and lubricating provisions for the rear axles or shafts 30 and 32 are shown in FIGS. 6 and 7. As shown in FIG. 6, an outer end portion of the housing 14 has a semi-cylindrical bearing surface 182 which contacts an outboard portion of the output shaft 30. The outer end of the lower housing part 16 has a semi-cylindrical surface 184 below the outer portion of the surface 182, with the two surfaces having annular grooves 186 in which a seal can be located. Inwardly of the surface 184, the lower housing part 16 has a larger, semi-cylindrical grease or lubricant cavity 188 below an inner portion of the bearing surface 182. The cavity 188 has beveled ends 190. Beyond the inner beveled end 190 is a lower, semi-cylindrical bearing surface 192 formed in the lower housing part 16. An upper, semi-cylindrical grease or lubricant cavity 194 is formed in the upper housing part 14 above the bearing surface 192. The cavity 194 has beveled ends 196, the outer one of which is over the inner beveled end 190 of the cavity 188. This enables communication between the two grease cavities so that grease can be supplied to both through a lower grease or lubricant tip 198 of the housing communicating with a grease passage 200 which communicates with the cavity 188.

With this design, the bearing surfaces 182 and 192 are exactly where they are needed for rotatably supporting the output shaft 30 which is urged in a counterclockwise direction as viewed in FIG. 6. At the same time, the lubricant cavities 188 and 194 which are opposite the bearing surfaces always assure a supply of lubricant to the portions of the shaft which contact the bearing surfaces 182 and 192.

Referring to FIG. 7, a bearing and lubricating arrangement for the output shaft 32 is substantially the same as that for the shaft 30 in FIG. 6. Accordingly, the outer end of the upper housing part 14 has a semi-cylindrical bearing surface 202 with the outer end of the lower housing part 16 also having a semi-cylindrical surface 204 with grooves 206 for a grease seal. A lubricant cavity 208 is located below a substantial, inner portion of the bearing surface 202 with the cavity 208 also having beveled ends 210. Inwardly from the cavity 208, the lower housing part 16 has a lower semi-cylindrical bearing surface 212 with the upper housing part having a semi-cylindrical grease or lubricant cavity 214. The cavity 214 has beveled ends 216, the outer one of which communicates with the inner beveled end 210 of the cavity 208. Grease can then be supplied to both through a lower tip 218 of the housing having a passage 220 communicating with the cavity 208. The bearing and lubrication provisions of FIG. 7 have the same advantages of FIG. 6 although the proportions of the bearing surfaces and cavities are somewhat different because the support of the output shafts 30 and 32 are not symmetrical.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. A transaxle comprising a housing, an input shaft rotatably carried by said housing, a shifting shaft rotatably carried by said housing, output shaft means carried by said housing, a driven gear on said input shaft, a first power-transmitting gear on said input shaft, two power-transmitting gears on said output shaft means meshing with said driven gear and said first power-transmitting gear, additional gear means for transmitting power from said driven gear to said output shaft means at a first range of speeds and from said first power-transmitting gear to said output shaft means at a second range of speeds, and shift means operable outside said housing for mechanically connecting said driven gear and said first power-transmitting gear to said input shaft, one at a time, said housing being in two parts with said input shaft, said shifting shaft, and said output shaft means carried by said parts at the meeting line, said input shaft, said shifting shaft, and said output shaft means being in a common plane with said output shaft means and said shifting shaft being on opposite sides of said input shaft.

2. A transaxle according to claim 1 characterized by said shift means comprising a shift dog mounted on said input shaft between said driven gear and said first power transmitting gear for slidable but non-rotatable movement with respect to said input shaft, a shift fork extending through said housing and engaging said shift dog, and lever means outside said housing for moving said shift fork.

3. A transaxle comprising an upper housing part, a lower housing part, an input shaft rotatably carried by said housing parts, a shifting shaft on one side of said shaft and rotatably carried by said housing parts, output shaft means on the other side of said input shaft and rotatably carried by said housing parts, a driven gear on said input shaft, at least one power-transmitting gear on said input shaft, at least two power-transmitting gears on said output shaft means, additional gear means on said input shaft and said shifting shaft for transmitting power to said output shaft means from said input shaft at a first plurality of different gear ratios from said driven gear and for transmitting power to said output shaft means from said input shaft at a second plurality of different gear ratios from said driven gear, said power-transmitting gear on said input shaft, and said power-transmitting gears on said output shaft means, and shift means for connecting said driven gear and said one power-transmitting gear on said input shaft to said input shaft, one at a time.

4. A transaxle comprising an upper housing part, a lower housing part, an input shaft rotatably carried by said housing parts, a shifting shaft on one side of said shaft and rotatably carried by said housing parts, output shaft means on the other side of said input shaft and rotatably carried by said housing parts, said output shaft means being two output shafts with a differential connecting the two shafts for transmitting power thereto, said housing parts having matching cavities forming a circular contour in the plane perpendicular to said two shafts, and said differential including a ring gear rotatably carried and supported by the boundaries of said cavities, said two output shafts extending into said cavities and each having a bevel gear affixed thereto, said ring gear having diametrically opposite channels, said channels being open ended and aligned with the axis of said ring gear, an axle received in said channels between the ends of said two output shafts, and bevel gears rotatably mounted on said axle and meshing with the bevel gears on said two output shafts, a driven gear on said input shaft, at least one power-transmitting gear on said input shaft, at least two power-transmitting gears on said output shaft means, additional gear means on said input shaft and said shifting shaft for transmitting power to said output shaft means from said input shaft at a first plurality of different gear ratios from said driven gear and for transmitting power to said output shaft means from said input shaft at a second plurality of different gear ratios from said driven gear, said power-transmitting gear on said input shaft, and said power-transmitting gears on said output shaft means, said differential being part of said additional gear means.

5. A transaxle according to claim 4 characterized by said additional gear means comprising two connected gears rotatably carried on said input shaft.

6. A transaxle according to claim 4 characterized by shift means operable outside of said upper housing part for shifting said transaxle between said first and said second plurality of different gear ratios.

* * * * *